(12) United States Patent
Oe et al.

(10) Patent No.: US 8,218,406 B2
(45) Date of Patent: Jul. 10, 2012

(54) LENS DRIVING APPARATUS

(75) Inventors: Haruki Oe, Chiyoda-ku (JP); Toru Ishimasa, Kawasaki (JP); Yoji Fujimura, Yokohama (JP); Kenichi Watabe, Shiki (JP)

(73) Assignee: Nidec Copal Corporation, Tokyo (JP)

( * ) Notice: Subject to any disclaimer, the term of this patent is extended or adjusted under 35 U.S.C. 154(b) by 326 days.

(21) Appl. No.: 12/453,689

(22) Filed: May 19, 2009

(65) Prior Publication Data

US 2010/0054101 A1    Mar. 4, 2010

(30) Foreign Application Priority Data

May 21, 2008   (JP) ................ 2008-133476
May 28, 2008   (JP) ................ 2008-139837

(51) Int. Cl.
*G11B 7/00*      (2006.01)
*G02B 7/02*      (2006.01)
(52) U.S. Cl. ................ 369/44.15; 369/44.22
(58) Field of Classification Search ............... 369/100, 369/44.15, 44.16, 44.17, 44.22, 44.19; 359/824, 359/210.2, 811, 818, 827
See application file for complete search history.

(56) References Cited

U.S. PATENT DOCUMENTS

| 5,642,235 A | 6/1997 | Ichikawa |
| 2004/0165288 A1 | 8/2004 | Daikoku |
| 2008/0088955 A1* | 4/2008 | Ishimasa et al. .............. 359/819 |
| 2010/0039717 A1 | 2/2010 | Ishimasa et al. |

FOREIGN PATENT DOCUMENTS

| JP | 4-111237 | 4/1992 |
| JP | 8-194145 | 7/1996 |
| JP | 9-049955 | 2/1997 |
| JP | 9-297255 | 11/1997 |
| JP | 11-305096 | 11/1999 |
| JP | 2004-253080 | 9/2004 |
| JP | 2005-331683 | 12/2005 |
| JP | 2006-14117 | 4/2006 |
| JP | 2006-114117 | 4/2006 |
| WO | 2008/044674 | 4/2008 |
| WO | 2008-056766 | 5/2008 |

OTHER PUBLICATIONS

Japanese Office Action (with English translation) issued Jan. 10, 2012 in corresponding Japanese Application 2008-133476.

* cited by examiner

*Primary Examiner* — Hoa T Nguyen
*Assistant Examiner* — Andrew Sasinowski
(74) *Attorney, Agent, or Firm* — Wenderoth, Lind & Ponack, LLP

(57) ABSTRACT

A lens driving apparatus that can be installed in an optical unit. The lens driving apparatus includes a lead screw rotated by rotation of a motor, a lens holder movable reciprocally along a rotation axis line of the lead screw by rotation of the lead screw, a guide shaft extending in parallel with the rotation axis line. The guide shaft passes through the lens holder to guide movement of a lens held at a free end of the lens holder in a cantilevered state.

14 Claims, 15 Drawing Sheets

LENS DRIVING APPARATUS

BACKGROUND OF THE INVENTION

1. Technical Field

The present invention relates to a lens driving apparatus mounted on an optical unit (e.g., a camera portion of a mobile terminal or an optical pickup mechanism of an optical disc drive) and utilized in focusing a lens or correcting a spherical aberration of a lens.

2. Description of the Related Art

In the optical pickup device set forth in JP-A-2006-114117, the lens driving apparatus utilized in correcting a spherical aberration of a lens is provided. The lens driving apparatus moves a lens holder forward/backward in the optical axis direction by means of an engagement between a worm gear rotated by a motor and a rack portion provided to a movable lens holder. A circular opening portion is provided in this lens holder, and the lens is fixed into this opening portion.

However, a frame portion forming a part of the lens holder is provided around the opening portion provided in the lens holder. Therefore, the lens must be reduced in view of the size of the frame portion; nevertheless it is requested on account of the characteristic that a lens face should be set as large as possible. In the prior art, it is difficult to solve such a mutually contradictory situation.

SUMMARY OF THE INVENTION

It is an object of the present invention to provide a lens driving apparatus capable of setting a size of a lens face as large as possible, by eliminating a frame portion forming a part of a lens holder from the periphery of a lens.

The present invention provides a lens driving apparatus installed into an optical unit, which includes a lead screw rotated by a rotation of a motor; a lens holder moved reciprocally along a rotation axis line of the lead screw by a rotation of the lead screw; a guide shaft extended in parallel with the rotation axis line, and passing through the lens holder to guide; and a lens held at a free end of the lens holder in a cantilever state.

The lens applied to this lens driving apparatus is held by the lens holder in a cantilevered state. Therefore, the frame portion forming a part of the lens holder is not needed around the lens. As a result, a lens face of the lens can be increased to a size that is as large as possible.

In the present invention, the devising required when the lens should be held by the lens holder in a cantilever state is applied variously to the lens and the lens holder. First, the lens has a projection portion that projects from an outer peripheral face of the lens in a direction that intersects orthogonally with an optical axis of the lens. Accordingly, the lens can be held easily and surely by the lens holder like the cantilever.

The lens has a first abutting portion positioned on the outer peripheral face of the lens on a base end side of the projecting portion. In contrast, the lens holder has a projection containing recess portion that is depressed from the free end of the lens holder to hold the projection portion therein, and a first contacting portion that is positioned on the free end side and the first abutting portion contacts. Accordingly, the fitting of the lens to the lens holder can be made easily and reliably with a simple structure.

It is preferable that the first abutting portion forms a circular arc around the optical axis.

Upon fitting the lens to the lens holder, when the projection portion of the lens is inserted into the projection containing recess portion of the lens holder, the first abutting portion of the lens comes into contact with the first contacting portion of the lens holder. At this time, the first abutting portion is formed to form a circular arc face around the optical axis. Therefore, even if there is a clearance between wall faces forming the projection containing recess portion and the projection portion, the projection portion is merely moved around the optical axis in the projection containing recess portion. Therefore, a position of the optical axis of the lens is never displaced. As a result, the lens can be fitted to the lens holder simply with good precision.

It is preferable that a second abutting portion that is extended on a plane that intersects orthogonally with the optical axis is formed in the projecting portion of the lens, and a first wall face forming the projection containing recess portion is a second contacting portion that is extended on a plane that intersects orthogonally with an axis line of the guide shaft and contacts the second abutting portion.

In this case, the lens is positioned with respect to the lens holder in the direction of the optical axis, by pushing the second abutting portion of the lens against the second contacting portion (first wall face) of the projection containing recess portion. As a result, the lens can be fitted to the lens holder more simply with good precision while preventing such a situation that the lens is fixed obliquely to the lens holder.

It is preferable that second wall faces forming the projection containing recess portion are projection restricting portions that restrict a turning of the projecting portion on the optical axis.

The projection portion is restricted to move on the optical axis in the projection containing recess portion. In this case, the turning of the projection portion can be restricted surely by the projection restricting portions (second wall faces) forming the projection containing recess portion. Therefore, a workability of fitting the lens to the lens holder can be improved.

It is preferable that the lens is an I-cut lens having a first cut face and a second cut face that are parallel with each other on an outer peripheral face of the lens, and the first cut face and the second cut face are extended in parallel with a projection direction of the projecting portion.

Since such I-cut lens is utilized, the lens driving apparatus can be slimmed down while increasing a size of the lens face.

It is preferable that a positioning pin and a whirl-stop pin are provided to one of the outer faces of the lens (or the projection portion) and the free end of the lens holder, the positioning pin protruding to the other and the whirl-stop pin protruding to the other and protruding in parallel with the positioning pin, and a positioning hole into which the positioning pin is inserted and a whirl-stop hole which is extended in a radial direction when viewed from a center of the positioning hole and into which the whirl-stop pin is inserted are provided to the other.

Upon fitting the lens to the lens holder, the positioning of the lens with respect to the lens holder can be made simply by inserting the positioning pin of the lens into the positioning hole of the lens holder. However, when only the positioning pin is used, the lens is turned on the positioning pin of the lens holder. Therefore, a position of the optical axis of the lens can be defined by inserting the whirl-stop pin into the whirl-stop hole that is extended in the radial direction when viewed from the center of the positioning hole. Because the whirl-stop hole is formed as a longitudinal hole, a dimensional tolerance between the positioning pin and the whirl-stop pin can be increased. Therefore, even though the positioning pin and the whirl-stop pin have a small size of 1 mm or less, the manufacture of the lens is facilitated. Because the whirl-stop hole is formed as a longitudinal hole, an amount of inflow of the adhesive can be increased, and thus the lens can be fixed firmly to the lens holder. As a result, the lens will not easily drop off the lens holder, and a shock resistance of the lens driving apparatus can be enhanced.

In this case, even when the positioning pin and the whirl-stop pin are provided on the lens holder side and the positioning hole and the whirl-stop hole are provided on the lens side, the advantages similar to the above can be achieved.

It is preferable that the positioning pin and the whirl-stop pin are extended in parallel with the optical axis of the lens, and are formed on an abutting face that extends perpendicularly to the optical axis of the lens, and the positioning hole and the whirl-stop hole are formed on an abutted face that extends perpendicularly to the optical axis of the lens.

Upon fitting the lens to the lens holder, the abutting face of the lens side comes in touch with the abutted face of the lens holder side. Therefore, the lens can be positioned simply and surely in the extending direction of the optical axis. When the adhesive is interposed between the abutting face and the abutted face, the lens can be fixed firmly to the lens holder. As a result, the lens is hard to drop off, and a shock resistance of the lens driving apparatus can be enhanced.

It is preferable that the positioning pin and the whirl-stop pin are extended in a tangential direction of a circle around the optical axis of the lens, and are formed on an abutting face that extends in parallel with the optical axis of the lens, and the positioning hole and the whirl-stop hole are formed on an abutted face that extends in parallel with the optical axis of the lens.

Upon fitting the lens to the lens holder, the abutting face of the lens side comes in touch with the abutted face of the lens holder side. Therefore, the lens can be positioned simply and surely in the extending direction of the positioning pin and the whirl-stop pin. When the adhesive is interposed between the abutting face and the abutted face, the lens can be fixed firmly to the lens holder. As a result, the lens is hard to drop off, and the shock resistance of the lens driving apparatus can be enhanced.

According to the present invention, the size of the lens face can be set as large as possible, by eliminating the frame portion forming a part of the lens holder from the periphery of the lens.

DETAILED DESCRIPTION OF THE INVENTION

Figure 1:
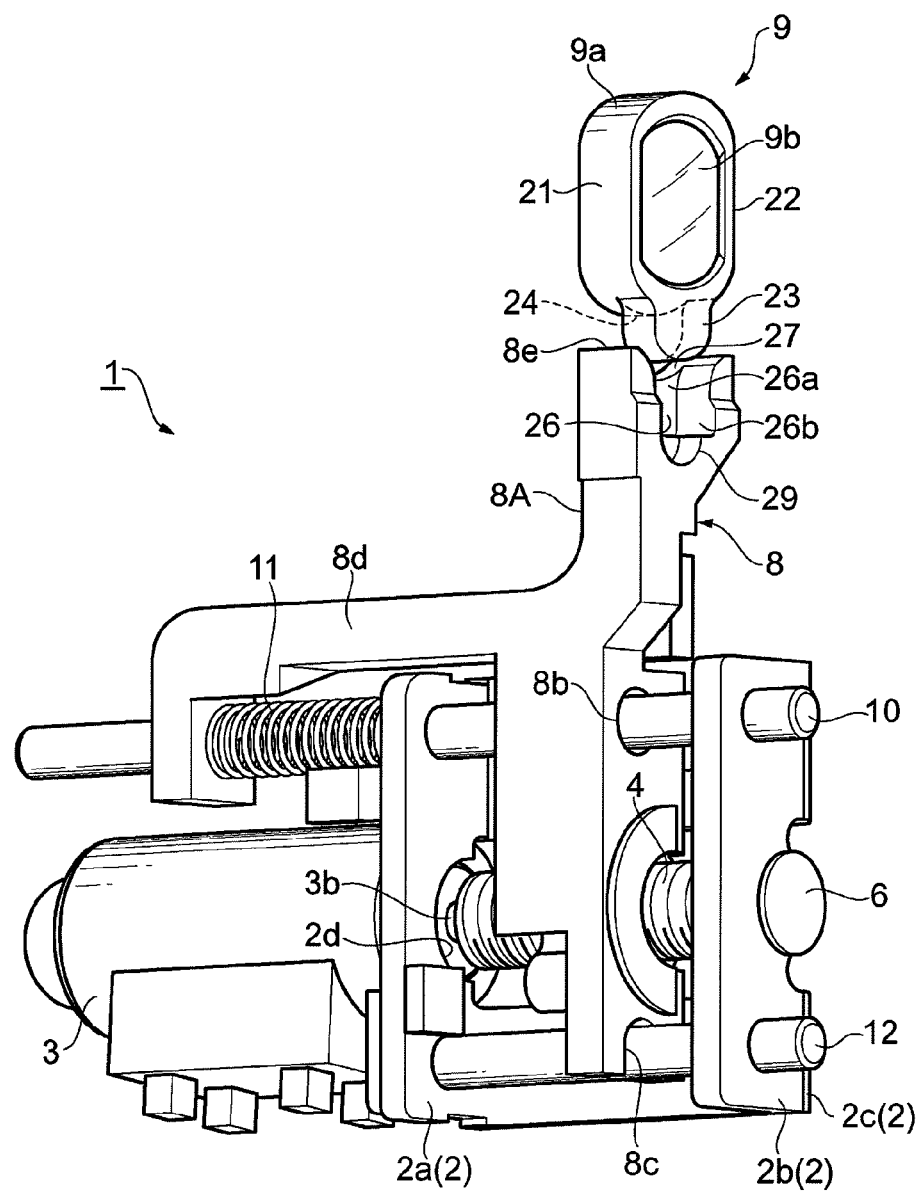
FIG. 1 is a perspective view showing a first embodiment of a lens driving apparatus according to the present invention.
Figure 2:
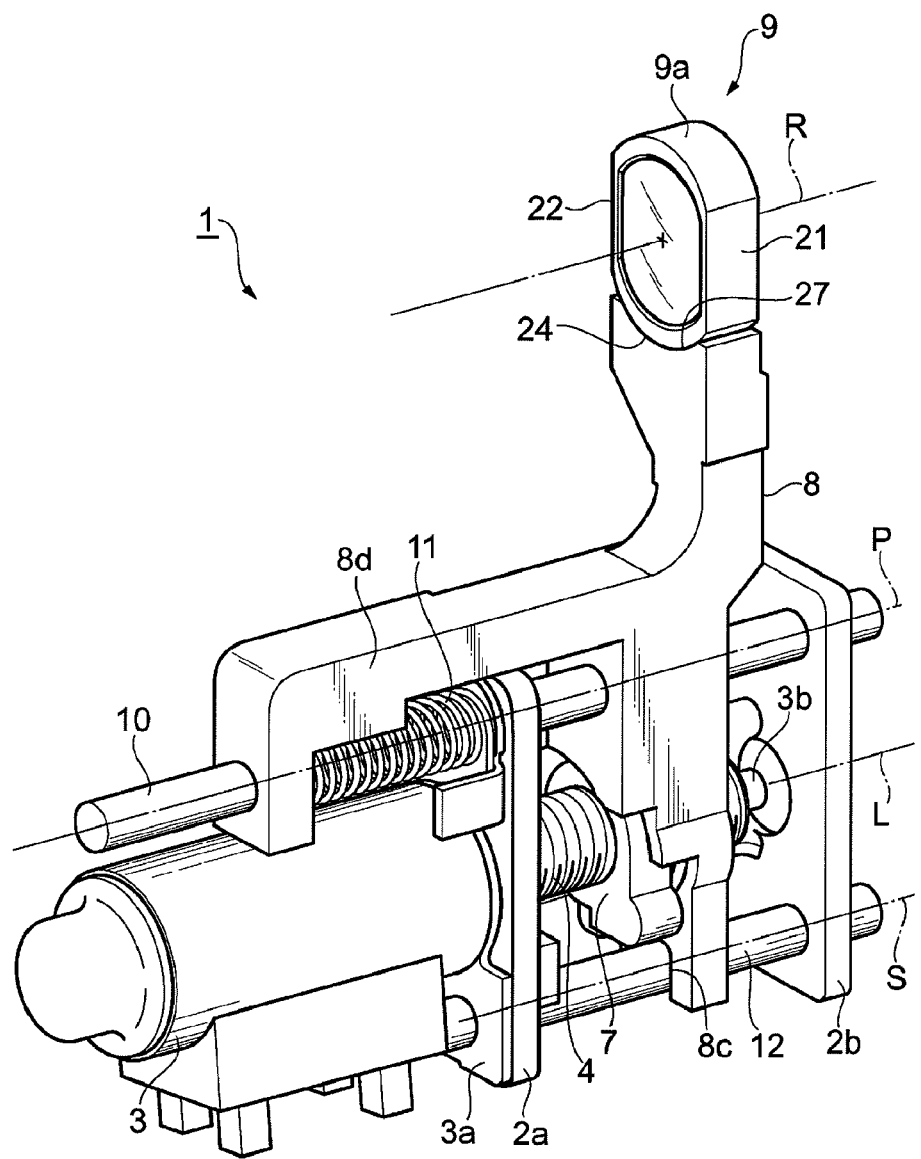
FIG. 2 is a perspective view of the lens driving apparatus when viewed from another angle.

Preferred embodiments of a lens driving apparatus according the present invention will be explained in detail with reference to the drawings hereinafter.

First Embodiment

In the optical pickup mechanism (optical unit) in the optical disc drive, an optical beam must be focused precisely on an information layer of the optical disc. For this reason, in the high-precision optical pickup mechanism, the lens must be moved finely in the optical axis direction such that a spherical aberration caused due to an error of a thickness of a cover layer of the optical disc can be corrected.

As shown in FIG. 1 to FIG. 4, a lens driving apparatus 1 installed into the optical pickup mechanism (optical unit) is utilized in correcting the spherical aberration of the lens, and has a U-shape base member 2 consisting of two sheets of parallel frames 2a, 2b and a bottom plate 2c. In order to construct them as a unit, various components, which are described later, are fitted to the base member 2.

A stepping motor 3 is fixed to the frame 2a via a bracket 3a, and a lead screw 4 is fixed to a rotary shaft 3b of the stepping motor 3 by press fitting. The lead screw 4 is inserted through an opening portion 2d formed in the frame 2a of the base member 2. Then, a top end of the rotary shaft 3b that protrudes from the lead screw 4 is supported rotatably by a bearing 6 that is fixed to the frame 2b of the base member 2.

The lead screw 4 passes through an arm-shaped lens holder 8, and is screwed into an internal thread portion 7. The lens holder 8 is always pressed onto the internal thread portion 7 by spring force. The lens holder 8 has a projection portion 8A that protrudes outward from the base member 2. This projection portion 8A is bent like a "<" shape in the same direction as the extending direction of the frames 2a, 2b and is extended (see FIG. 3). A pickup lens 9 is fixed to a free end 8e of the lens holder 8 by adhesive, and thus lens 9 is arranged on the outside of the base member 2.

A guide shaft 10 extending in parallel with a rotary axis line L of the lead screw 4 is fixed to base member 2 such that the guide shaft extends between the frame 2a and the frame 2b. The guide shaft 10 is inserted into a guide hole 8b formed through the lens holder 8. Therefore, the lens holder 8 can be reciprocally moved precisely along an axis line P of the guide shaft 10 by rotating the lead screw 4 forwardly/backwardly. Accordingly, the pickup lens 9 is moved linearly precisely such that the axis line P of the guide shaft 10 becomes parallel with an optical axis R of the pickup lens 9.

A compression coil spring 11 for energizing the lens holder 8 in the extending direction of the rotary axis line L is arranged in the base member 2. The compression coil spring 11 is wound around the guide shaft 10. One end of the compression coil spring 11 is fixed to the frame 2a, and the other end of the compression coil spring 11 is fixed to an end portion of an L-shaped leg portion 8d that is extended from the lens holder 8. The guide shaft 10 passes through the leg portion 8d.

The lens holder 8 can always be pressed against the internal thread portion 7 by an energizing force of the compression coil spring 11. This energizing force is applied to the internal thread portion 7. Therefore, the internal thread portion 7 can be screwed onto the lead screw 4 without fail, and improvement of the feeding precision of the lens holder 8 can be achieved.

A whirl-stop shaft 12, an axis line S of which extends in parallel with the rotary axis line L of the lead screw 4 and the axis line P of the guide shaft 10, is fixed to the base member 2 to extend between the frame 2a and the frame 2b. This whirl-stop shaft 12 is inserted into a U-shape notched portion 8c, which is formed on an end portion of the lens holder 8, to restrict rotation of the lens holder 8 about the rotary axis line L of the lead screw 4.

Figure 5:
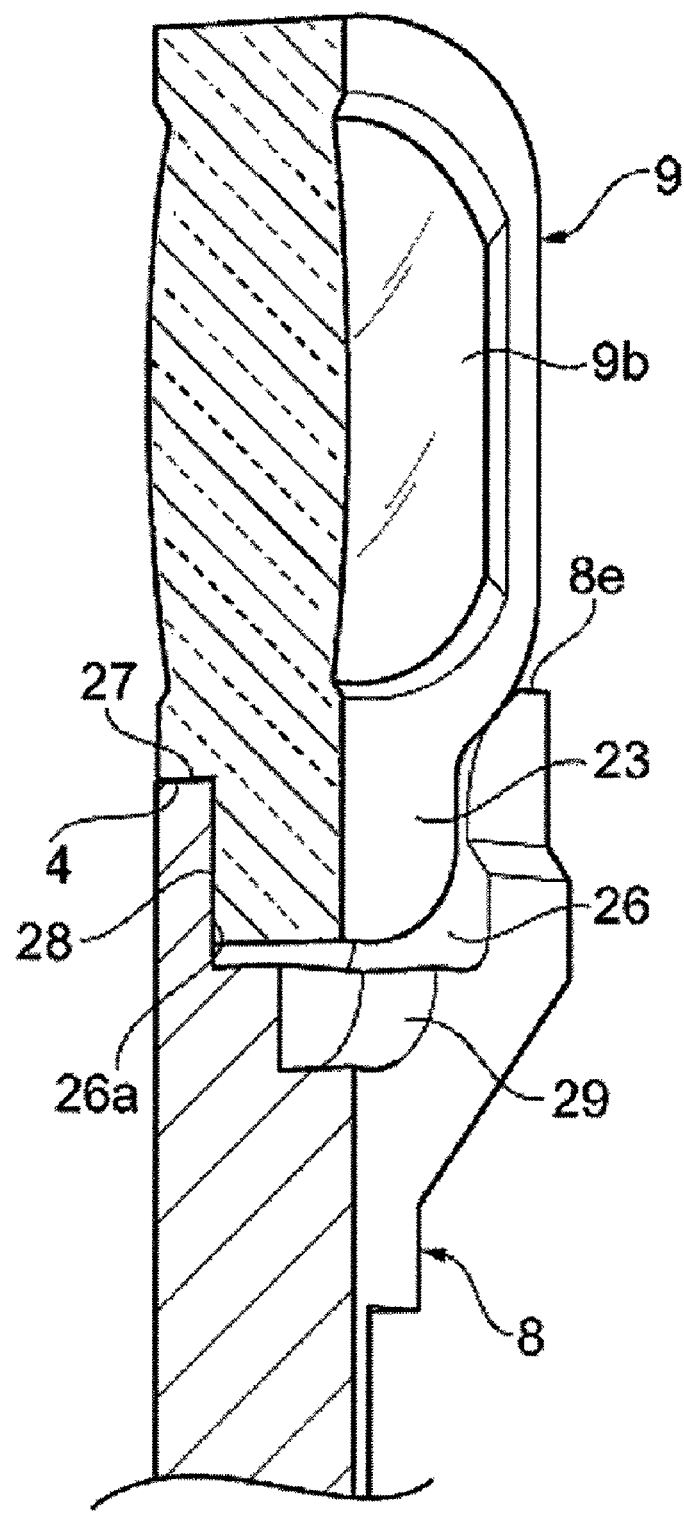
FIG. 5 is a sectional view showing a joined state of a lens and a lens holder.
Figure 6:
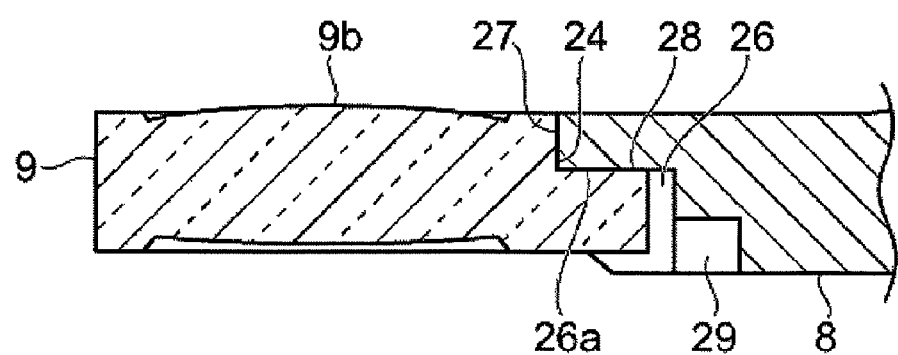
FIG. 6 is a sectional view showing the joined state of the lens and the lens holder.

As shown in FIG. 1, FIG. 5 and FIG. 6, an I-cut lens having a first cut face 21 and a second cut face 22, which are parallel mutually on an outer peripheral surface 9a, is utilized as the lens 9. The lens 9 is fixed to the lens holder 8 by adhesive in a cantilevered state. Therefore, the frame portion forming a part of the lens holder 8 is not needed around the lens. As a result, a lens face 9b of the lens 9 can be increased in size as large as possible.

The lens 9 utilized in correcting a spherical aberration is very small, e.g., a width between the cut faces 21, 22 is 4 mm and a diameter of a circular arc portion positioned on both sides of the cut faces 21, 22 is 5 mm. Therefore, the devising of enlarging the lens face 9b while reducing an outer shape is needed in millimeter order.

The lens 9 has a tong-like projection portion 23 and a first abutting portion 24. This tong-like projection portion 23 protrudes from the outer peripheral surface 9a of the lens 9 in the direction that intersects orthogonally with the optical axis R. This first abutting portion 24 is positioned on the outer peripheral surface 9a of the lens 9 on the base end side of the projection portion 23 to form a circular arc surface around the optical axis R. The projection portion 23 and the first abutting portion 24 positioned on the base end of the projection portion 23 are positioned between the first cut face 21 and the second cut face 22, and are aligned in the direction of the optical axis R. A top end of the projection portion 23 is formed in a semi-circular shape.

The lens holder 8 to which the lens 9 is fixed has a projection containing recess portion 26, and a first contacting portion 27. This projection containing recess portion 26 is depressed from the free end 8e of the lens holder 8 to hold the projection portion 23 therein. This first contacting portion 27 is positioned on the free end 8e side, and the first abutting portion 24 contacts this first contacting portion 27. The first contacting portion 27 is aligned with the projection containing recess portion 26 in the direction of the optical axis R, and forms the same circular arc face as the first abutting portion 24. Accordingly, the fitting of the lens 9 to the lens holder 8 can be made easily and reliably with a simple structure.

Upon fitting the lens 9 to the lens holder 8 by a jig, when the projection portion 23 of the lens 9 is inserted into the projection containing recess portion 26 of the lens holder 8, the first abutting portion 24 of the lens 9 comes into contact with the first contacting portion 27 of the lens holder 8. At this time, the first abutting portion 24 is formed so as to form a circular arc face on the optical axis R. Therefore, even if there is a clearance K between second wall faces 26b forming the projection containing recess portion 26 and the projection portion 23 (see FIG. 7), the projection portion 23 is merely moved around the optical axis R in the projection containing recess portion 26. Therefore, a position of the optical axis R of the lens 9 is never displaced. As a result, the lens 9 can be fitted to the lens holder 8 easily and with good precision.

A second abutting portion 28 extending on a plane that intersects orthogonally with the optical axis R is formed on the projection portion 23 of the lens 9. In contrast, a first wall face 26a forming the projection containing recess portion 26 is extended on a plane that intersects orthogonally with the axis line P of the guide shaft 10, and forms a second contacting portion that the second abutting portion 28 contacts.

Upon inserting the projection portion 23 of the lens 9 into the projection containing recess portion 26 of the lens holder 8, the second abutting portion 28 of the lens 9 is pushed against the second contacting portion (first wall face) 26a of the projection containing recess portion 26. Therefore, the lens 9 is positioned with respect to the lens holder 8 in the direction of the optical axis R. As a result, the lens 9 can be fitted to the lens holder 8 more simply with good precision while preventing a situation in which the lens 9 is fixed obliquely to the lens holder 8.

Figure 3:
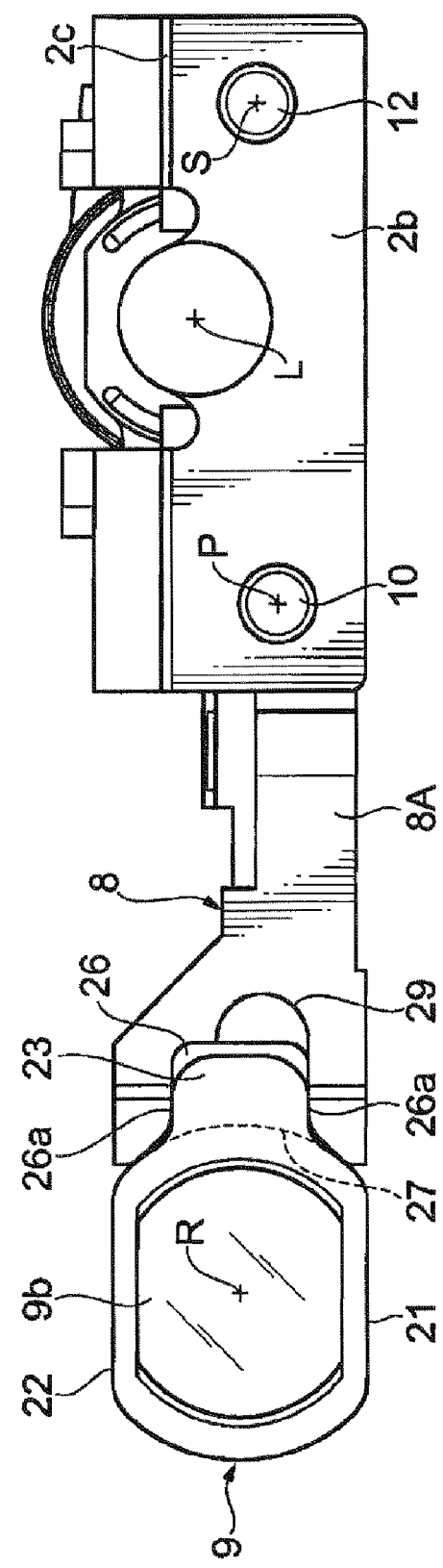
FIG. 3 is a front view of the lens driving apparatus.
Figure 4:
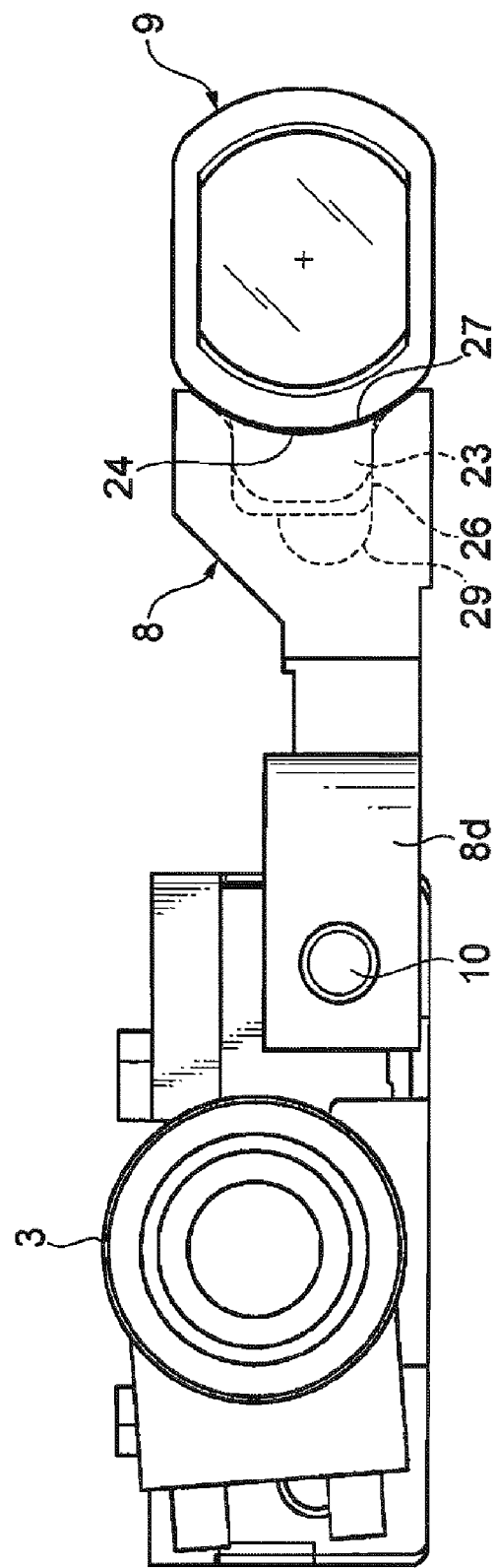
FIG. 4 is a rear view of the lens driving apparatus.
Figure 7:
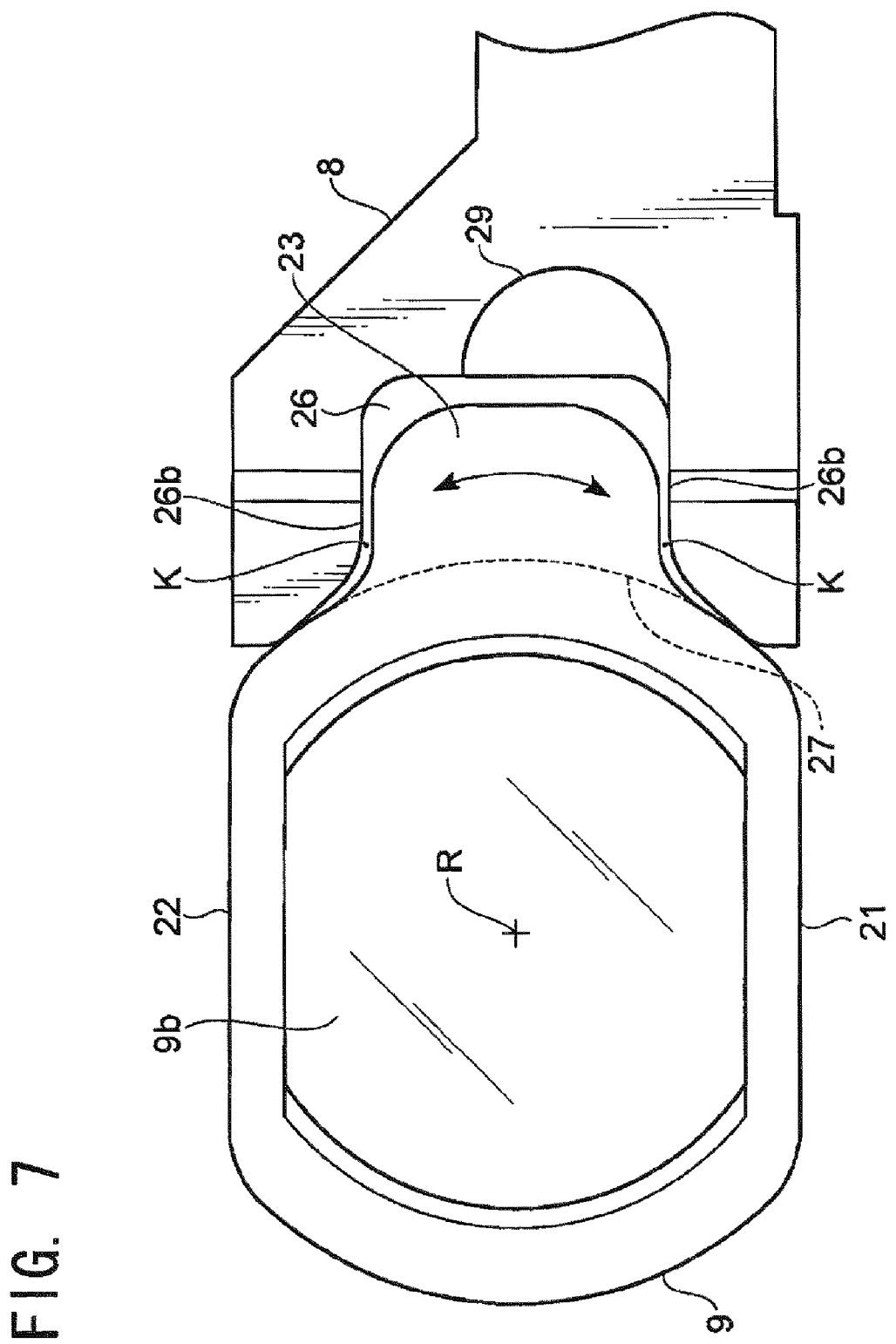
FIG. 7 is an enlarged view showing the joined state of the lens and the lens holder.

As shown in FIG. 1, FIG. 3, and FIG. 7, the second wall faces 26b forming the projection containing recess portion 26 are formed in parallel with each other and act as the projection restricting portions that restrict the turn of the projection portion 23 on the optical axis R. Even though the clearance K provided to make the fitting operation of the lens 9 to the lens holder 8 easy is formed between the second wall faces 26b and the projection portion 23, the turning of the projection portion 23 on the optical axis R can be restricted surely by the projection restricting portions (second wall faces) 26b being provided in parallel mutually. Therefore, the workability of fitting the lens 9 to the lens holder 8 can be improved.

The foregoing lens 9 is an I-cut lens that has first and second cut faces 21, 22 that are in parallel with each other on the outer peripheral surface 9a. The first and second cut faces 21, 22 extend in parallel with the projecting direction of the projection portion 23. Because such I-cut lens is utilized, the lens 9 can be held within a thickness of the lens driving apparatus 1 while increasing a size of the lens face 9b (see FIG. 3).

The lens 9 can be fixed to the lens holder 8 by press fitting. In this case, there is a possibility that the press-fitted portion will become loose due to a temperature variation. A thermal caulking can be utilized in fitting. In this case, there is a possibility that the lens 9 made of plastics will be influenced at the time of heating. Therefore, the lens 9 is fixed to the lens holder 8 by adhesive that is coated on wall faces forming the projection containing recess portion 26 and the first contacting portion 27.

A semi-circular adhesive reservoir recess portion 29 passing through the projection containing recess portion 26 is provided on the lens holder 8. The extra adhesive can be caused to run into the adhesive reservoir recess portion 29.

It is needless to say that the present invention is not limited to the above embodiment. For example, the lens driving apparatus 1 may be installed into the optical unit (for example, the camera portion of the mobile terminal) and may be utilized in focusing the lens or correcting a spherical aberration of the lens. The lens 9 may be formed of a normal circular lens. Either of the first abutting portion 24 and the first contacting portion 27 may be constructed by a linear circular shape. The first abutting portion 24 and the first contacting portion 27 may be constructed such that a point of contact may be positioned on both sides of the projection portion 23 instead of a surface contact such as a circular arc surface, or the like.

Second Embodiment

In the lens driving apparatus 1 according to the second embodiment, the same reference symbols are affixed to the same constituent portions as those in the first embodiment, and their redundant explanation will be omitted herein. In this case, reference numeral 109 is affixed to the lens, and reference numeral 108 is affixed to the lens holder. Explanation of the second embodiment will be made hereunder.

Figure 8:
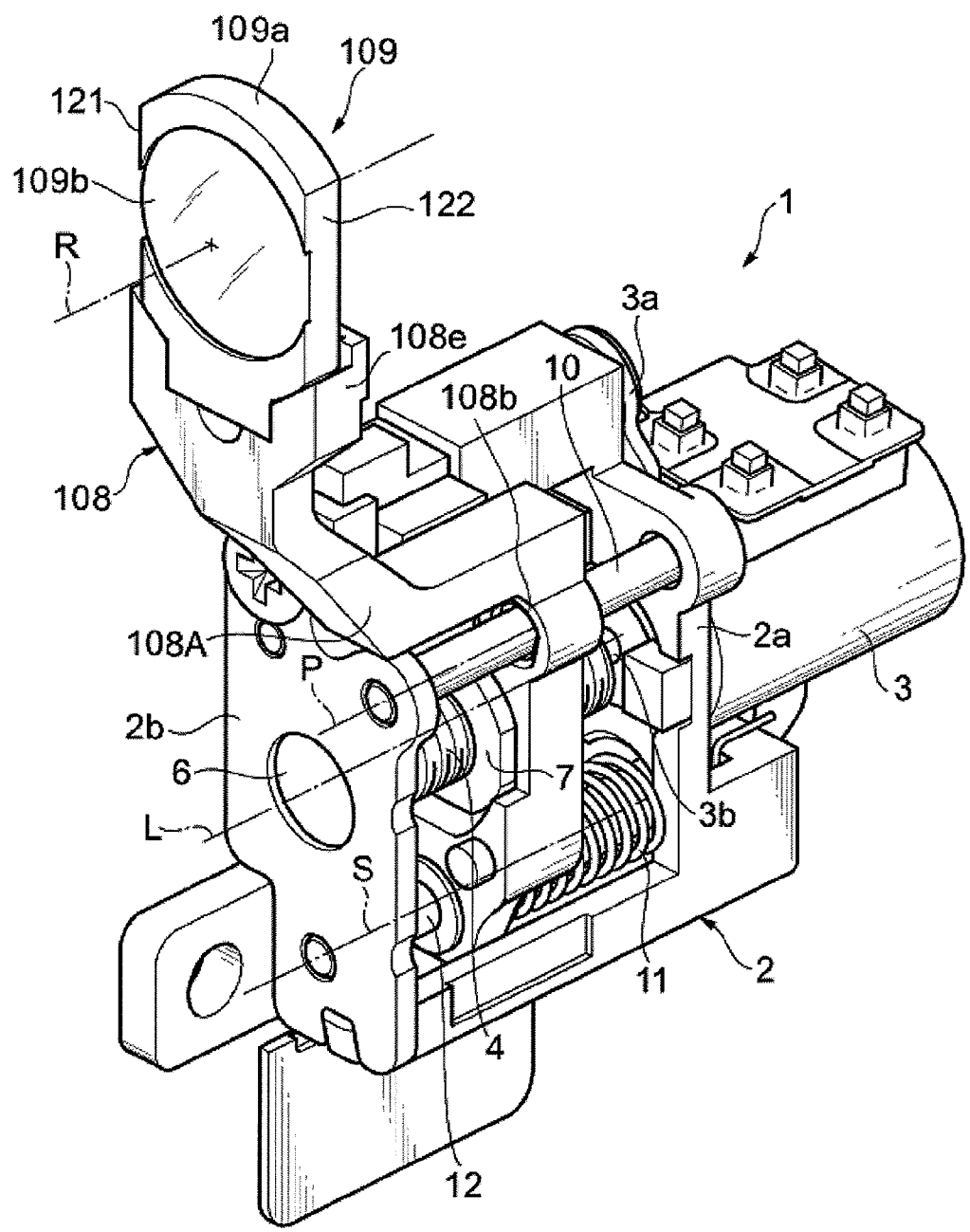
FIG. 8 is a perspective view showing a second embodiment of a lens driving apparatus according to the present invention.

FIG. 8 is a perspective view showing a second embodiment of a lens driving apparatus according to the present invention. The base member 2 in the second embodiment has basically the same configuration as the base member 2 in the first embodiment, but aspects described hereunder are different. In the second embodiment, the compression coil spring 11 is wound around the whirl-stop shaft 12. A hole portion, into which the whirl-stop shaft 12 is inserted, is provided in the end portion of the lens holder 108. The whirl-stop shaft 12 is fixed to the base member 2 through the compression coil spring 11 such that the compression coil spring 11 is arranged between the frame 2a and the lens holder 108.

The lens 9 utilized in correcting a spherical aberration is very small, e.g., a width between cut faces 121, 122 is 4 mm and a total length of the cut faces 121, 122 in the extending direction is 5 mm to 6 mm. Therefore, it is necessary to enlarge a lens face 109b while reducing an outer shape in millimeter order.

Figure 9:
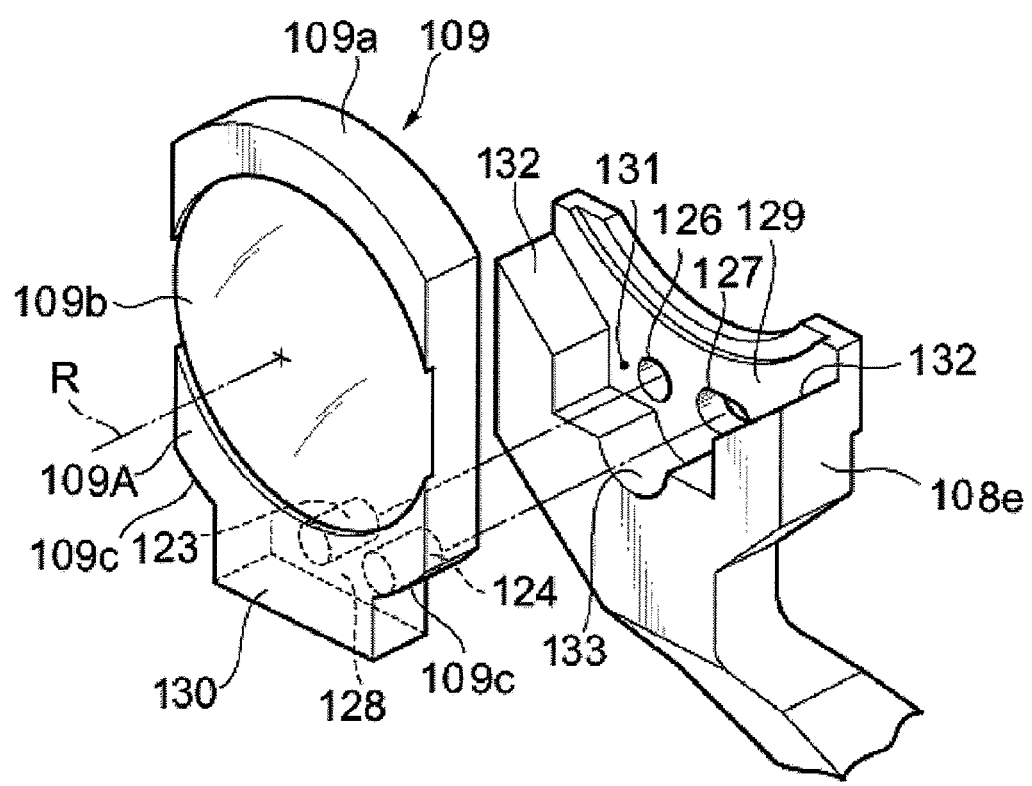
FIG. 9 is a perspective view showing a pertinent portion of the lens driving apparatus shown in FIG. 8.

As shown in FIG. 9, the lens 109 has a cylindrical positioning pin 123 and a cylindrical whirl-stop pin 124. This positioning pin 123 is projected from an outer face 109a of the lens 109. The cylindrical whirl-stop pin 124 projects from the outer face 109a of the lens 109 and protrudes in parallel with the positioning pin 123. In contrast, the lens holder 108 has a circular positioning hole 126 and a longitudinal hole-like whirl-stop hole 127. This positioning hole 126 is provided in a free end 108e of the lens holder 108, and has a diameter substantially equal to the positioning pin 123. The positioning pin 123 is inserted into the positioning hole 126. This whirl-stop hole 127 is extended in the radial direction when viewed from a center of the positioning hole 126, and has the shorter side width substantially equal to a diameter of the whirl-stop pin 124. The whirl-stop pin 124 is inserted into the whirl-stop hole 127.

Upon fitting the lens 109 to the lens holder 108, the positioning of the lens 109 with respect to the lens holder 108 can be made simply by inserting the positioning pin 123 of the lens 109 into the positioning hole 126 of the lens holder 108. However, when only the positioning pin 123 is used, the lens 109 can turn about the positioning pin 123 with respect to the lens holder 108. Therefore, a position of the optical axis R of the lens 109 can be defined by inserting the whirl-stop pin 124 into the whirl-stop hole 127 that is extended in the radial direction when viewed from the center of the positioning hole 126.

Because the whirl-stop hole 127 is formed as a longitudinal hole, a dimensional tolerance between the positioning pin 123 and the whirl-stop pin 124 can be increased. Therefore, even though the positioning pin 123 and the whirl-stop pin 124 have a small size of 1 mm or less, the manufacture of the lens 109 is facilitated. Because the whirl-stop hole 127 is formed as a longitudinal hole, an amount of inflow of the adhesive can be increased, and thus the lens 109 can be fixed firmly to the lens holder 108. As a result, the lens 109 will not easily drop off, and the shock resistance of the lens driving apparatus 1 can be enhanced.

The positioning pin 123 and the whirl-stop pin 124 are extended in parallel with the optical axis R of the lens 109, and are formed on an abutting face 128 that is extended perpendicularly to the optical axis R of the lens 109. The abutting face 128 is provided on the outer face 109a below a lens face 109b, and is utilized as an adhesion face.

The circular positioning hole 126 and the whirl-stop hole 127 are formed on an abutted face 129 that extends perpendicularly to the optical axis R of the lens 109. This abutted face 129 is provided to the free end 108e of the lens holder 108, and is utilized as an adhesion face.

Upon fitting the lens 109 to the lens holder 108, the abutting face 128 of the lens 109 side comes in contact with the abutted face 129 of the lens holder 108 side. Therefore, the lens 109 can be positioned simply and surely in the extending direction of the optical axis R. When the adhesive is interposed between the abutting face 128 and the abutted face 129, the lens 109 can be fixed firmly to the lens holder 108. As a result, the lens 109 will not easily drop off, and the shock resistance of the lens driving apparatus 1 can be enhanced.

A tongue-like projection portion 130 is provided to the lens 109. This tongue-like projection portion 130 projects from a lens main body 109A having the lens face 109b in the direction that intersects orthogonally with the optical axis R. The positioning pin 123 and the whirl-stop pin 124 protrude from a surface of the projection portion 130. A projection containing recess portion 131 for containing the projection portion 130 therein is provided in the free end 108e of the lens holder 108. When the surface of the projection portion 130 and the wall face of the projection containing recess portion 131 are utilized as the adhesion face, expansion of the adhesion surface can be achieved, and the lens 109 can be fixed to the lens holder 108 more firmly. As a result, the lens 109 is securely fixed in the lens holder, and the shock resistance of the lens driving apparatus 1 can be enhanced.

A cut portion 109c connected to the projection portion 130 is provided at an end portion of the projection portion 130 side of the lens main body 109A. The cut portion 109c comes into contact with an inclined face 132 that is connected to the wall face of the projection containing recess portion 131. According to this construction, the fitting of the lens 109 to the lens holder 108 is made easy.

A semi-circular adhesive reservoir recess portion 133 that is communicated with the projection containing recess portion 131 is provided in the lens holder 108. The extra adhesive can be caused to run into the adhesive reservoir recess portion 133.

Third Embodiment

In a lens driving apparatus 1A according to this embodiment, the same reference symbols are affixed to the same constituent portions as those in the above second embodiment, and their redundant explanation will be omitted herein. In this case, a reference numeral 40 is attached to the lens, and a reference numeral 50 is attached to the lens holder.

Figure 10:
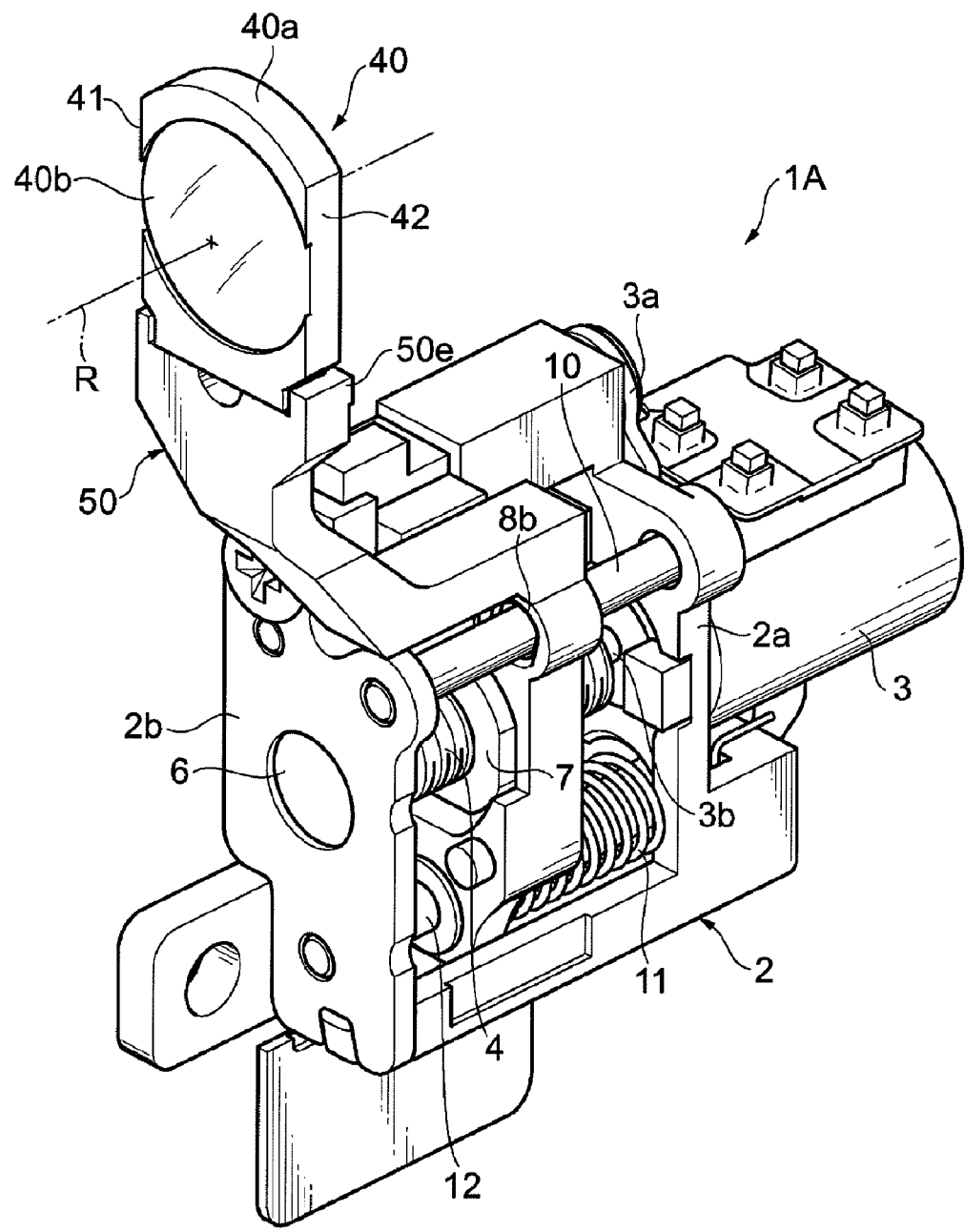
FIG. 10 is a perspective view showing a third embodiment of a lens driving apparatus according to the present invention.
Figure 11:
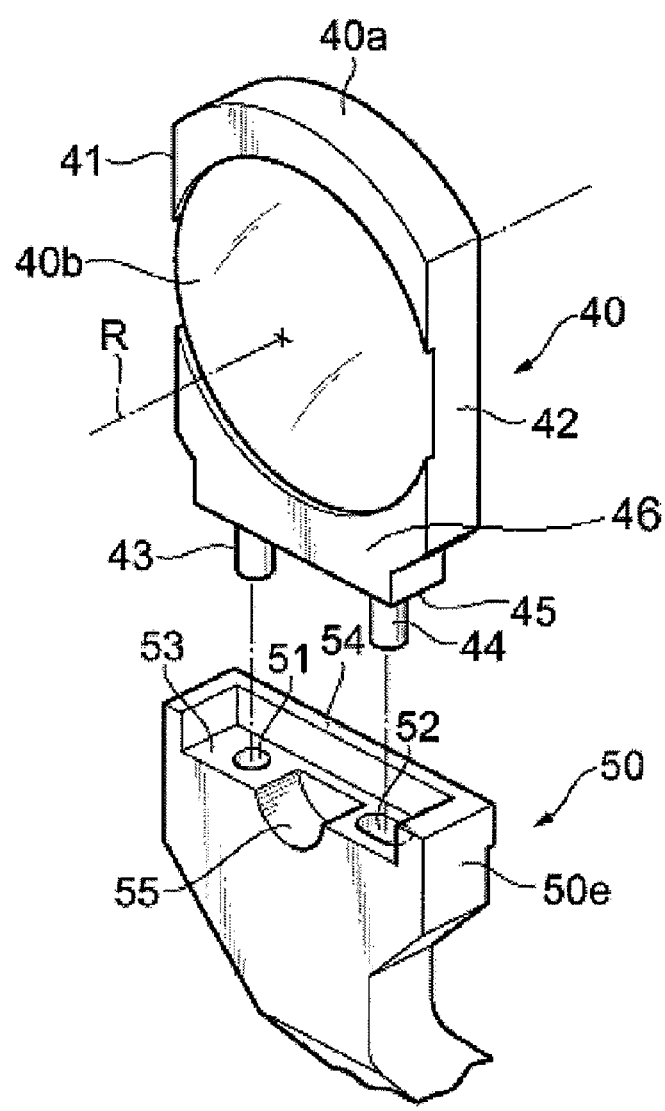
FIG. 11 is a perspective view showing a pertinent portion of the lens driving apparatus shown in FIG. 10.
Figure 12:
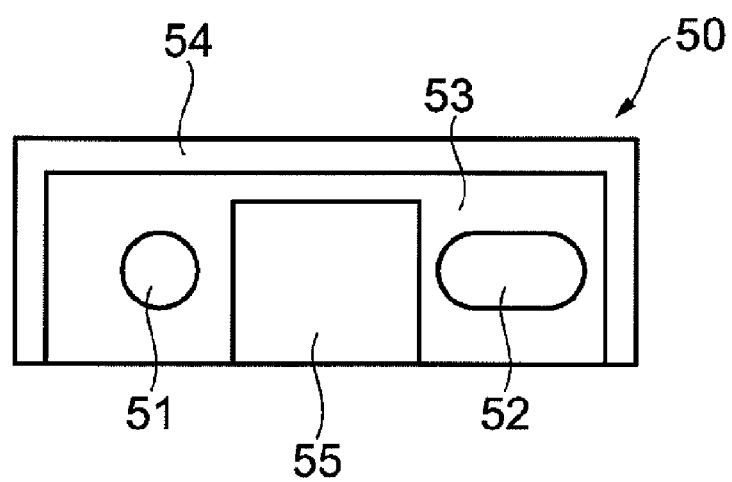
FIG. 12 is a plan view showing a free end of the lens holder.

As shown in FIG. 10 and FIG. 11, a positioning pin 43 and a whirl-stop pin 44, which are applied to the lens 40 having cut faces 41, 42, are extended in the tangential direction of a circle that has the optical axis R of the lens 40 as a center, i.e., in the direction perpendicular to the optical axis R of the lens 40, and are formed on an abutting face 45 that is extended in parallel with the optical axis R of the lens 40. In contrast, a positioning pin 51 and a whirl-stop hole 52 applied to the lens holder 50 are formed on an abutted face 53 that extends in parallel with the optical axis R of the lens 40 (see FIG. 12).

Here, reference numeral 46 denotes a projection portion of the lens 40, reference symbol 40a denotes an outer face of the lens 40, reference symbol 40b denotes a lens face, and reference symbol 50e denotes a free end of the lens holder 50.

Upon fitting the lens 40 to the lens holder 50, the abutting face 45 of the lens 40 side comes into contact with the abutted face 53 of the lens holder 50 side. Therefore, the lens 40 can be positioned simply and reliably in the extending direction of the positioning pin 43 and the whirl-stop pin 44. When the adhesive is interposed between the abutting face 45 and the abutted face 53, the lens 40 can be fixed firmly to the lens holder 50. As a result, the lens 40 is secured in the lens holder, and the shock resistance of the lens driving apparatus 1A can be enhanced.

A U-shaped upright wall 54 is formed around the abutted face 53. When the wall face of the upright wall 54 is utilized as the adhesion face, expansion of the adhesion surface can be achieved, and the lens 40 can be fixed to the lens holder 50 more securely. As a result, the lens 40 is securely fixed in the lens holder, and the shock resistance of the lens driving apparatus 1A can be enhanced.

A semi-circular adhesive reservoir recess portion 55 is provided at almost the center of the abutted face 53 of the lens holder 50. The extra adhesive can be caused to run into the adhesive reservoir recess portion 55.

Figure 13:
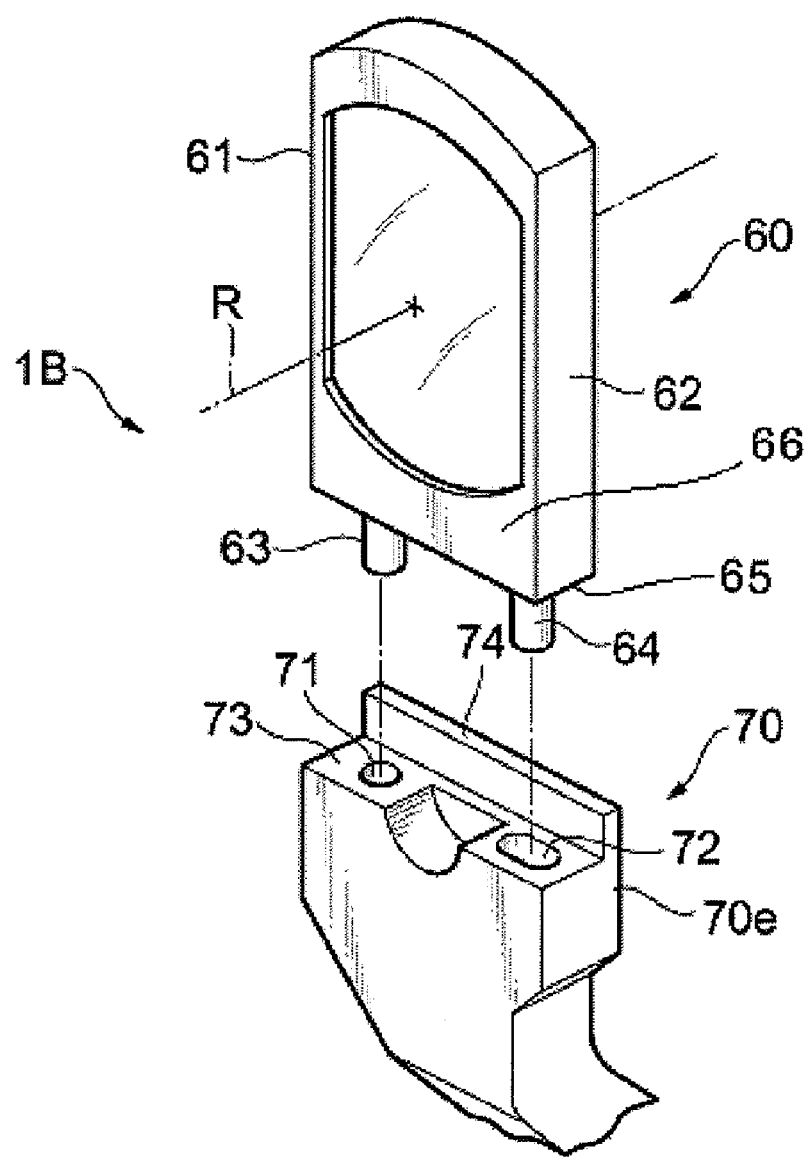
FIG. 13 is a perspective view showing a fourth embodiment of a lens driving apparatus according to the present invention.

It is needless to say that the present invention is not limited to the above embodiment. For example, as shown in FIG. 13, in a lens driving apparatus 1B according to another embodiment, a positioning pin 63 and a whirl-stop pin 64 applied to a lens 60 having cut faces 61, 62 are inserted into a positioning hole 71 and a whirl-stop hole 72 respectively. The positioning hole 71 and the whirl-stop hole 72 are formed on an abutted face 73 that is extended in parallel with the optical axis R of the lens 60. A linear upright wall 74 is formed adjacent to this abutted face 73. When a wall face of this upright wall 74 is utilized as an adhesion face, expansion of the adhesive surface can be achieved and a free end 70e of a lens holder 70 can be reduced in size. Here, reference numeral 65 denotes an abutting face, and reference numeral 66 denotes a projection portion.

In this case, the upright walls 54, 74 may be omitted to reduce the weight and the size of the lens holders 50, 70.

The lens driving apparatuses 1, 1A, 1B may be installed in the optical unit (for example, the camera portion of the mobile terminal), and may be utilized in focusing the lens or correcting a spherical aberration of the lens. The lenses 109, 40, 60 may be formed of a normal circular lens.

When the positioning pin and the whirl-stop pin are provided on the lens holder 108, 50, 70 side and the positioning hole and the whirl-stop hole are provided on the lens 109, 40, 60 side, the advantages similar to the above can also be achieved.

With the above, the embodiments of the lens driving apparatus according to the present invention are explained variously. In this case, an optical pickup device 200 and an optical disc drive 300, into which such lens driving apparatus 1 is installed, respectively, can be constructed.

Figure 14:
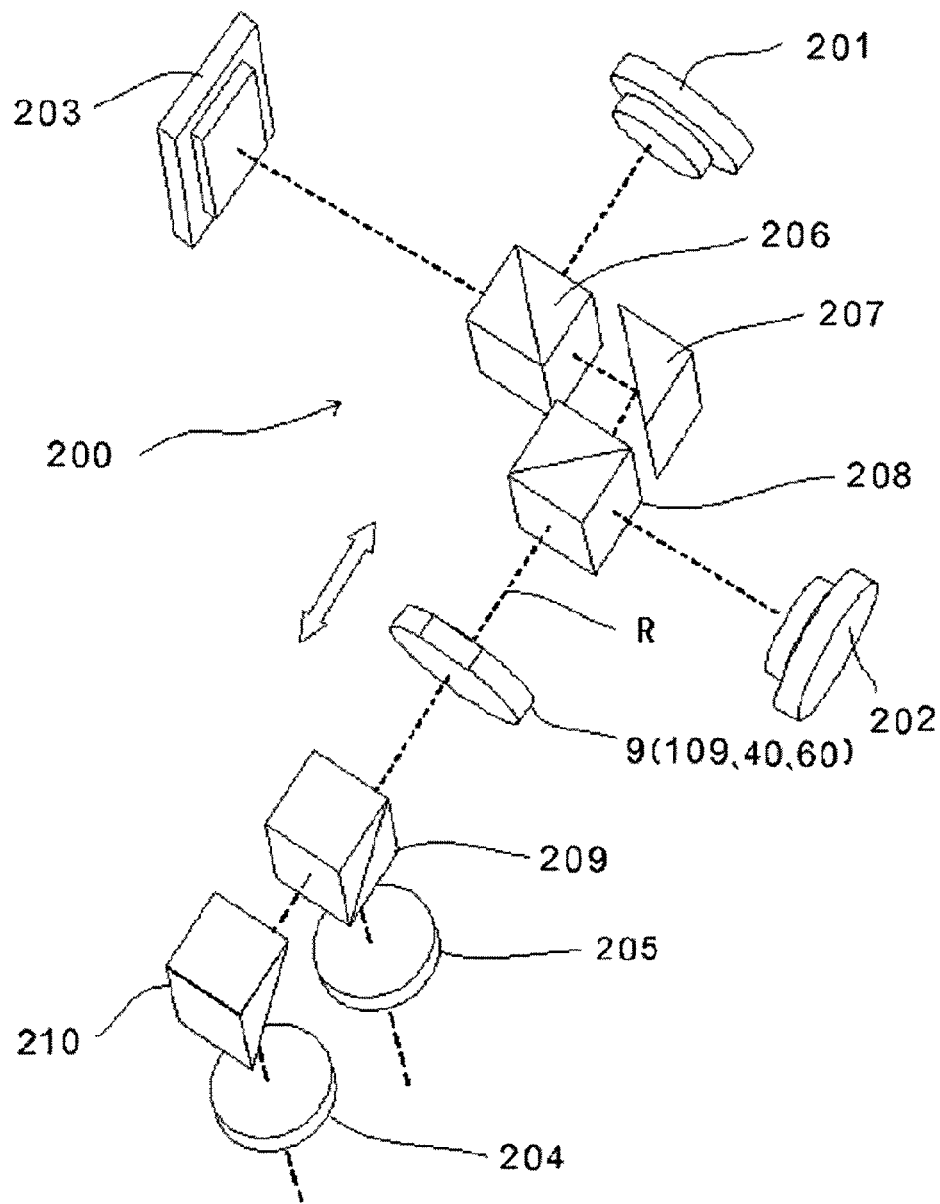
FIG. 14 is a perspective view showing an optical pickup device according to the present invention.

The optical pickup device 200 is employed to read/write (R/W) the information recorded on Compact Disc (CD), Digital Versatile Disc (DVD), or Blu-ray Disc (BD) (Japanese Registered Trademarks No. 5084442, No. 4622587). As shown in FIG. 14, the optical pickup device 200 is equipped with a red-color laser diode 201 for emitting a red light used in CD or DVD, a blue-color laser diode 202 for emitting a blue light used in BD, and a photo detector 203 for receiving the red-color light and the blue-color light. A CD/DVD objective lens 204 for focusing the red-color light on CD/DVD, and a BD objective lens 205 for focusing the blue-color light on BD are provided on an outer surface of the optical pickup device 200.

In order to correct a spherical aberration of the objective lenses 204, 205, the lens driving apparatus 1 using the lens 9, 109, 40, 60 as a collimator lens is installed. A correction of a spherical aberration is executed by moving the lens 9, 109, 40, 60 of the lens driving apparatus 1 in the direction of the optical axis R.

Next, optical paths of the red-color light will be explained hereunder. The red-color light emitted from the red-color laser diode 201 passes through a beam splitter 206, a triangular prism 207, a beam splitter 208, a collimator lens 9 (109, 40, 60), and a beam splitter 209, then is reflected perpendicularly to a recording face of CD/DVD by a triangular prism 210, and then forms a beam spot on the recording face of CD/DVD by the CD/DVD objective lens 204. The red-color light reflected by CD/DVD passes through the CD/DVD objective lens 204, the triangular prism 210, the beam splitter 209, the collimator lens 9 (109, 40, 60), the beam splitter 208, and the triangular prism 207, then passes straight through the beam splitter 206, and then is incident on the photo detector 203.

Next, optical paths of the blue-color light will be explained hereunder. The blue-color light emitted from the blue-color laser diode 202 passes through the beam splitter 208 and the collimator lens 9 (109, 40, 60), then is reflected perpendicularly to a recording face of BD by the beam splitter 209, and then forms a beam spot on the recording face of BD by the BD objective lens 205. The blue-color light reflected by BD passes through the BD objective lens 205, the beam splitter 209, and the collimator lens 9 (109, 40, 60), then passes straight through the beam splitter 208, passes through the triangular prism 207 and the beam splitter 206, and then is incident on the photo detector 203.

As to the red-color light and the blue-color light incident on the photo detector 203, wavelengths of the red-color light and the blue-color light are converted into electronic signals by a converting means (not shown). As a result, the information recorded on CD/DVD/BD can be read.

Figure 15:
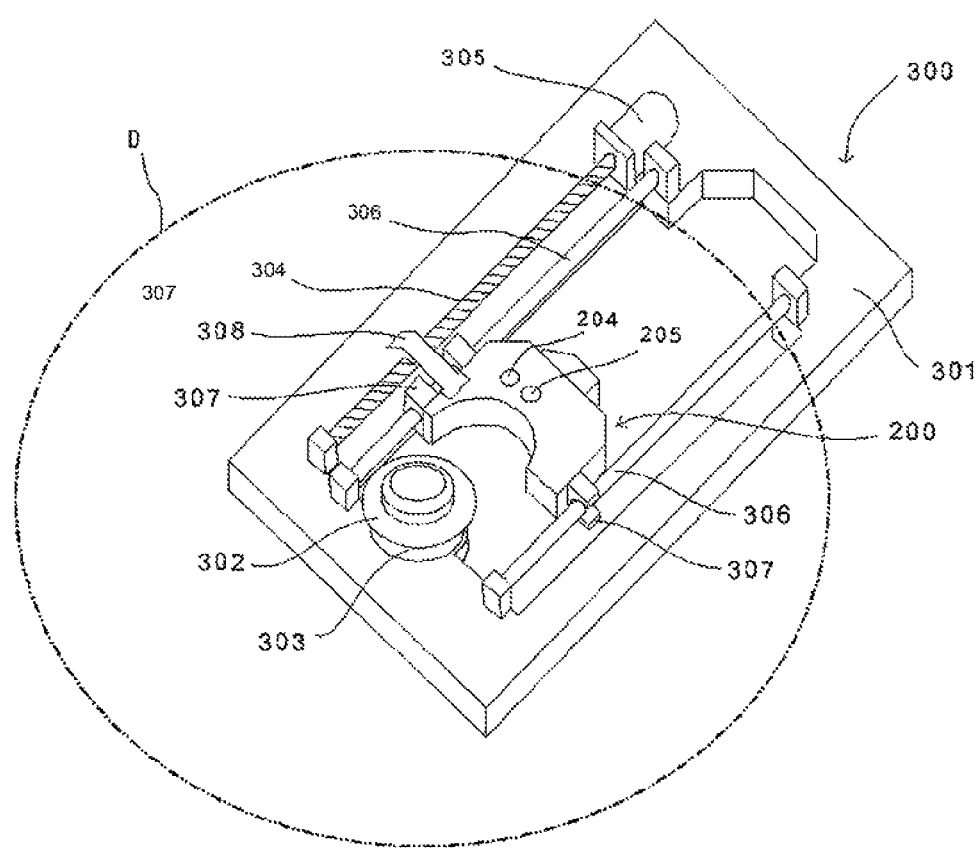
FIG. 15 is a perspective view showing an optical disc drive according to the present invention.

This optical pickup device 200 is installed into the optical disc drive 300. As shown in FIG. 15, in the optical disc drive 300, a turntable 302 which is inserted into a center hole of the CD/DVD/BD (referred to as a "disc D" hereinafter) and on which the disc D is loaded is provided, and the disc D loaded on the turntable 302 is turned by a spindle motor 303 fixed on a base 301. A pickup lead screw 304 is borne rotatably on the base 301, and a thread motor 305 for turning the pickup lead screw 304 and a guide member 306 are fixed onto the base 301. The guide member 306 may be provided such that its skew can be adjusted.

In the optical pickup device 200, a guided portion 307 that contacts slidably relative to the guide member 306 is formed, and a rack portion 308 that engages with the pickup lead screw 304 is provided. In the optical pickup device 200, the CD/DVD objective lens 204 and the BD objective lens 205 provided on the outer surface of the optical pickup device 200 are opposed to the disc D loaded on the turntable 302.

In this case, the pickup lead screw 304 and the guide member 306 are provided in parallel with each other such that the optical pickup device 200 is moved in the radial direction of the disc D loaded on the turntable 302.

The optical pickup device 200 is moved by the thread motor 305 in the radial direction of the disc D while turning the disc D put on the turntable 302 by the spindle motor 303, and a red-color beam spot is formed on the disc D (CD/DVD) by the CD/DVD objective lens 204 of the optical pickup device 200 or a blue-color beam spot is formed on the disc D (BD) by the BD objective lens 205 of the optical pickup device 200. As a result, the information recorded on the disc D can be read.

In this case, the present invention is explained in reading the information recorded on the disc D (CD/DVD/BD). But the present invention can also be applied to the optical pickup device and the optical disc drive to record the information on the disc D (CD/DVD/BD).

What is claimed is:

1. A lens driving apparatus installed in an optical unit, the lens driving apparatus comprising:
   a lead screw rotated by rotation of a motor;
   a lens holder movable reciprocally along a rotation axis line of the lead screw in response to rotation of the lead screw;
   a guide shaft extended in parallel with the rotation axis line, and passing through the lens holder to guide the lens holder; and
   a lens held at a free end of the lens holder in a cantilever state,
   wherein the lens includes a projection portion that projects from an outer peripheral face of the lens in a direction that intersects orthogonally with an optical axis of the lens, and the projection portion is held at the free end of the lens holder.

2. The lens driving apparatus according to claim 1, wherein the lens includes a first abutting portion positioned on the outer peripheral face of the lens on a base end side of the projecting portion, and the lens holder includes:
   a projection containing recess portion that is depressed from the free end of the lens holder to hold the projection portion therein, and
   a first contacting portion that is positioned on the free end side and contacts the first abutting portion.

3. The lens driving apparatus according to claim 2, wherein the first abutting portion forms a circular arc around the optical axis.

4. The lens driving apparatus according to claim 2, wherein:
   a second abutting portion that is extended on a plane that intersects orthogonally with the optical axis is formed in the projecting portion of the lens; and
   a first wall face that forms the projection containing recess portion is a second contacting portion that is extended on a plane that intersects orthogonally with an axis line of the guide shaft and contacts the second abutting portion.

5. The lens driving apparatus according to claim 2, wherein second wall faces that forms the projection containing recess portion are projection restricting portions that restrict a turning of the projecting portion around the optical axis.

6. The lens driving apparatus according to claim 1, wherein the lens is an I-cut lens having a first cut face and a second cut face that are parallel with each other on an outer peripheral face of the lens, and the first cut face and the second cut face are extended in parallel with a direction in which the projecting portion projects.

7. The lens driving apparatus according to claim 1, wherein:
   a positioning pin and a whirl-stop pin are provided on one of the projecting portion of the lens and the free end of the lens holder, the positioning pin and the whirl-stop pin protruding to the other of the projecting portion of the lens and the free end of the lens holder, and the whirl-stop pin protruding in parallel with the positioning pin, and
   a positioning hole into which the positioning pin is inserted and a whirl-stop hole which is extended in a radial direction when viewed from a center of the positioning hole and into which the whirl-stop pin is inserted.

8. An optical pickup device into which the lens driving apparatus according to claim 1 is installed.

9. An optical disc drive into which the optical pickup device according to claim 8 is installed.

10. A lens driving apparatus installed in an optical unit, the lens driving apparatus comprising:
    a lead screw rotated by rotation of a motor;
    a lens holder movable reciprocally along a rotation axis line of the lead screw in response to rotation of the lead screw;
    a guide shaft extended in parallel with the rotation axis line, and passing through the lens holder to guide the lens holder; and
    a lens held at a free end of the lens holder in a cantilever state, wherein:
    a positioning pin and a whirl-stop pin are provided on one of the outer face of the lens and the free end of the lens holder, the positioning pin and the whirl-stop pin protruding to the other of the outer face of the lens and the free end of the lens holder, and the whirl-stop pin protruding in parallel with the positioning pin; and
    a positioning hole into which the positioning pin is inserted and a whirl-stop hole which is positioned in a radial direction when viewed from a center of the positioning hole and into which the whirl-stop pin is inserted, wherein the positioning hole and the whirl-stop hole are formed in the other of the outer face of the lens and the free end of the lens holder.

11. The lens driving apparatus according to claim 10, wherein:
    the positioning pin and the whirl-stop pin are extended in parallel with the optical axis of the lens, and are formed on an abutting face of the outer face of the lens that extends perpendicularly to the optical axis of the lens; and
    the positioning hole and the whirl-stop hole are formed in an abutted face of the free end of the lens holder that extends perpendicularly to the optical axis of the lens.

12. The lens driving apparatus according to claim 10, wherein
    the positioning pin and the whirl-stop pin are extended in a tangential direction of a circle around the optical axis of the lens, and are formed on an abutting face of the outer face of the lens that extends in parallel with the optical axis of the lens, and
    the positioning hole and the whirl-stop hole are formed on an abutted face of the free end of the lens holder that extends in parallel with the optical axis of the lens.

13. The lens driving apparatus according to claim 10, wherein:
    the positioning pin and the whirl-stop pin are extended in parallel with the optical axis of the lens, and are formed on an abutting face of the free end of the lens holder that extends perpendicularly to the optical axis of the lens; and
    the positioning hole and the whirl-stop hole are formed in an abutted face of the outer face of the lens that extends perpendicularly to the optical axis of the lens.

14. The lens driving apparatus according to claim 10, wherein:
    the positioning pin and the whirl-stop pin are extended in a direction perpendicular to the optical axis of the lens, and are formed at an abutting face of the free end of the lens holder that extends in parallel with the optical axis of the lens; and
    the positioning hole and the whirl-stop hole are formed in an abutted face of the outer face of the lens that extends in parallel with the optical axis of the lens.

* * * * *